United States Patent
Wang

(10) Patent No.: US 10,226,735 B2
(45) Date of Patent: Mar. 12, 2019

(54) INTEGRATED ENHANCED HEAT EXCHANGE METHOD BY COMBINING BOUNDARY LAYER CONTROL WITH MAINSTREAM DISTURBANCE

(71) Applicant: Xiaohua Wang, Hangzhou, Zhejiang (CN)

(72) Inventor: Xiaohua Wang, Zhejiang (CN)

(73) Assignee: Xiaohua Wang, Hangzhou, Zhejiang (CN)

( * ) Notice: Subject to any disclaimer, the term of this patent is extended or adjusted under 35 U.S.C. 154(b) by 0 days.

(21) Appl. No.: 15/353,621

(22) Filed: Nov. 16, 2016

(65) Prior Publication Data

US 2017/0067657 A1 Mar. 9, 2017

Related U.S. Application Data

(63) Continuation-in-part of application No. 14/112,758, filed as application No. PCT/CN2012/070727 on Jan. 28, 2012, now abandoned.

(30) Foreign Application Priority Data

Jul. 14, 2011 (CN) .......................... 2011 1 0197093

(51) Int. Cl.
*F24F 3/14* (2006.01)
*F24F 5/00* (2006.01)
(Continued)

(52) U.S. Cl.
CPC .......... *B01D 53/265* (2013.01); *F24F 3/1405* (2013.01); *F24F 5/0042* (2013.01);
(Continued)

(58) Field of Classification Search
CPC .... F24F 3/14; F24F 5/0042; F24F 2003/1446; H05K 5/0213; F25B 21/04; F26B 23/04; B01B 53/265; B01B 2257/80
See application file for complete search history.

(56) References Cited

U.S. PATENT DOCUMENTS 2,045,698 A * 6/1936 Christoffersen .......... F24F 6/04
261/92
3,741,285 A * 6/1973 Kuethe ................... B64C 21/10
165/109.1

(Continued)

*Primary Examiner* — Elizabeth J Martin
(74) *Attorney, Agent, or Firm* — Global IP Services; Tianhua Gu

(57) ABSTRACT

An integrated enhanced heat exchange method by boundary layer control with mainstream disturbance comprises a multiple of heat transfer enhancement units, in which a periodic vortex is formed along a extending direction of the flow control channel by setting boundary layer flow control devices, the vortex cleans the cold and hot side walls, as a result the flow boundary layer that hinders heat transfer is destroyed, and rapidly transferring cold and heat energy generated from the cold and hot side walls to a flow mainstream channel is realized. A mainstream disturbance device is set on the mainstream of flow to form an axial vortex at the back of the mainstream disturbance device, the axial vortex cooperates with a stream from the flow boundary layer to rapidly transfer the cold and heat energy from the flow boundary layer to entire field to form an even temperature field.

11 Claims, 5 Drawing Sheets

(51) Int. Cl.
*B01D 53/26* (2006.01)
*F24F 13/08* (2006.01)
*F24F 13/22* (2006.01)

(52) U.S. Cl.
CPC ............ F24F 13/08 (2013.01); F24F 13/222 (2013.01); *F24F 2003/1446* (2013.01); *F24F 2221/46* (2013.01)

(56) References Cited

U.S. PATENT DOCUMENTS

| | | | | |
|---|---|---|---|---|
| 4,529,357 A | * | 7/1985 | Holland | F01D 5/181 416/92 |
| 6,158,224 A | * | 12/2000 | Hu | F24F 3/14 62/3.4 |
| 6,250,083 B1 | * | 6/2001 | Chou | F24F 3/14 62/3.4 |

* cited by examiner

INTEGRATED ENHANCED HEAT EXCHANGE METHOD BY COMBINING BOUNDARY LAYER CONTROL WITH MAINSTREAM DISTURBANCE

CROSS REFERENCE TO RELATED PATENT APPLICATION

This application is a continuation in part application (CIP) of the U.S. Ser. No. 14/112,758 filed Oct. 18, 2013, which is a national stage of PCT/CN2012/070727 filed Jan. 28, 2012 claiming the priority of CN201110197093.8 filed Jul. 14, 2011.

FIELD OF THE INVENTION

This invention involves dehumidification and drying, especially a heat transfer enhancement method/system with cold & heat exchange, boundary layer control and mainstream disturbance.

BACKGROUND OF THE INVENTION

Quick dehumidification of humid air or other process gases is an important issue associated with daily life and with numerous industrial applications.

Due to the increased public demands for the quality of air, food and medicines humidity control in the production and living environments has become increasingly important. In the industrial field, the existence of humid air and condensate may directly result in corrosion and malfunction of instruments and parts, or even failure of the corresponding process system. Meanwhile, humidity will inevitably lead to a change in the features of process materials with adverse effects on production. In our daily life, humidity is a fundamental factor in the growth of mold and a main factor for lesion. As a result, the transmission of pathogenic bacteria and pollutants to the air and the human body will be quickened. Studies show that the appropriate humidity for the human body (depending on the location and the seasonal ambient temperature) should be controlled to be 40-65%. The independent control of air humidity has become an inevitable development trend, however, in view of the energy crisis and environmental deterioration, it is obvious that development of a dehumidification process and system with high efficiency and energy conservation is the ultimate goal for dehumidification techniques.

The existing mature dehumidification techniques mainly include cooling dehumidification, liquid absorption dehumidification, solid absorption dehumidification, HVAC (heating, ventilation and air conditioning) dehumidification and the reel absorption dehumidification, developed on the basis of the solid absorption dehumidification techniques. With the transition of semiconductor cooling and heating techniques from the aeronautical and aerospace field to the civil field, the application of a novel dehumidification technique, thermoelectric cooling dehumidification has become more and more widely used to meet the demand for energy conservation and emission reduction.

Cooling dehumidification is to make use of a natural or artificial cooling source to cool humid air till reaching a temperature below the dew point, so as to remove the water vapor that exceeds the saturated humidity from the humid air in the form of condensate. The freezing dehumidifier is the most representative cooling dehumidification equipment. The freezing dehumidifier normally comprises of refrigerant compressor, evaporator, condenser, expansion valve, draught fan and air valve. This is the earliest and matures dehumidification technique featuring low initial investment, high COP, reliability, convenience and no need for a heat source. And this technique is the most widely used one in our daily life. However, as this technique adopts the Carnot cycle, the refrigeration agent eventually has an adverse impact on the environment. Also, despite the high COP, coupling process systems comprising multiple machines inevitably result in excessive consumption of electrical energy. This type of dehumidification system is also inappropriate for application at adverse ambient temperature (extremely high or low), and is not easy to maintain. Due to these problems of environmental impact and extremely high energy consumption, its application will be subject to more and more stringent control.

Liquid absorption dehumidification is to use a liquid drying agent to absorb vapor from humid air under the action of pressure gradient in view of the fact that the partial pressure of the vapor on the surface of the drying agent is lower than that in the humid air. This ensures consistent vapor partial pressure between the air and the agent. Liquid drying agent shall be dewatered for reuse. A typical liquid absorption dehumidification device comprises of dehumidifier, regenerator, vapor cooler, heat exchanger and pump. Liquid absorption dehumidification equipment boasts of a high processing capacity and a great dehumidification effect. Furthermore, the liquid drying agent can purify the air by absorbing such hazardous substances as partial pathogenic bacteria and chemical pollutants in the air in addition to the absorption of vapor. Liquid absorption requires the heat regenerated by the drying agent. Such heat can be obtained from low-grade heat sources, such as solar energy and industrial waste heat, which makes low energy consumption possible. But in this case, it is necessary to consider the stability of the heat source. The investment amount and coverage area will also change accordingly. As the overall coverage area of liquid absorption dehumidification equipment is greater than that of freezing dehumidification devices, constant maintenance is required. In view of relatively low COP of the system the corrosion of the drying agent to equipment and the control of liquid flow (prevention of droplets), this mode is mainly suitable for industrial application.

Just like liquid absorption dehumidification, solid absorption dehumidification is to use a drying agent to absorb vapor from the air. The only difference is that the drying agent is solid. The drying agent may release large quantities of heat during absorption of vapor. To maintain a great absorption capacity, it is necessary to cool the drying agent during absorption, which inevitably results in increased energy consumption. Reel absorption dehumidifier is the most typical solid absorption equipment, mainly comprising of drying reel, regenerating heater, dehumidification draught fan and regenerating fan. In the reel absorption dehumidification equipment, the damp air and regenerated air are delivered via the fans. And the rotation of the reel results in great noise. So regular mechanical maintenance is required. The higher the absorption capacity of the drying agent on the reel is, the higher the energy consumption during regeneration will be, and the higher temperature the regeneration process will require. Additional cooling equipment is required according to environmental requirements when necessary. Compared with cooling dehumidification, the solid absorption dehumidification technique features low COP and high dehumidification capacity, which is particularly applicable to treatment of air at low temperature and low humidity. The main applications are in industrial production processes.

With higher levels of production and increased living standards, awareness of environmental protection and energy conservation has been further enhanced. Various technical approaches and methods have been adopted to improve technological efficiency. And, more and more technological processes have been developed for greener or cleaner production. It is the same for dehumidification techniques. The development of green and environment-friendly processes and the technological innovation for energy conservation have become an inevitable development trend in the industry. In recent years, energy consumption and pollution (emission of CO2 and leakage of Freon), related to conventional air conditioning systems, have witnessed a continuous increase accompanied by an increase in the demand for air conditioning worldwide. Presently, the proportion of energy consumption for air conditioning is over 15% and increasing. Vapor content in the air varies significantly with regional features and the change of seasons. Due to the high latent heat produced by evaporation, dehumidification has become one of the main energy consumption parts of the air conditioning system, accounting for 20-40% of the total energy consumption of the air conditioning system. Improvements in dehumidification methods are an important step for energy conservation of air conditioning systems. Thermoelectric and cooling dehumidification techniques are based on the Peltire effect and the Beck effect, which is the application of thermoelectric refrigeration principles in the dehumidification process. This is characterized by small volume, high stability, no need of refrigerant or drying agent and environment-friendliness. This is an advanced technique in the field of dehumidification. Owing to the integration of the cooling and heating functions, thermal condensing dehumidification performs cooling and heating treatments simultaneously, resulting in low energy consumption. Compared with conventional condensing dehumidification systems, the overall power and energy consumption are significantly reduced. This system can use solar energy as the source of electric energy. And the adjustment of the condensing and heating effect through controlling the current flow is simply controlled. This ease of control ensures high stability for the whole dehumidification process. The thermoelectric device has a working life of over 100,000 hours, which far exceeds that of conventional condensing dehumidification equipment. With the exception of the low-power fan used for air flow and condensation, the equipment is free of mechanical transmissions throughout the whole dehumidification process; it features low noise, quick start-up and less stringent environmental requirements. As the ambient operating temperature is between −40 and 70° C., it is available for operation in extreme environments, and can be adapted to the designated working zones at will. In conclusion, this will inevitably become an important direction and method for the future development of dehumidification techniques.

However, the thermoelectric condensation dehumidification technology has the limits in that the boundary layer blocks the cold and heat transfer, and the mainstream flow cannot be efficiently heated or cooled, thus limiting the heat transfer and dehumidification capacity. For the traditional process, as shown in FIG. 1, according to hydromechanics, in the flow channels without flow control, both the upper and lower vane 110 would form the flow area. The air 170 flows in from the inlet at the left side. Starting from the inlet end, due to the adhesive property of the air, upper and lower boundary layers 160 form on the surface of the vane. The boundary layer shown in FIG. 1 represents the flow boundary layer. The fluid adjacent to the vane wall is at the same speed as the vane due to adhesion and generally static. Due to the existence of the flow boundary layer, a temperature boundary layer occurs, which is thicker than the speed boundary layer shown in FIG. 1. Due to the existence of the two kinds of boundary layer, the heat transfer between side wall and fluid is directly restrained. In addition, as the flow speed is progressively slower as it gets closer to the wall, this creates an environment for unclean fluid deposition on the surface of the vane. This impedes the heat transfer. Except the boundary area, the flow in the middle is the mainstream, which decides the characteristics of the whole fluid. Without effective control, the mainstream is of rapid and short flow based on the principle that fluid flows towards areas of the least resistance. This impedes the heat exchange of the integrated fluid with that clinging at the boundary and the overall heat transfer efficiency is reduced. Currently there is technical information regarding boundary layer flow control. See FIG. 2, the two structures are directly extruded from the wall plane. The shape of such structure can be adjusted randomly, but the size is small. The flow behind these structures is intended to disturb the boundary layer. The structure of these bulges can be varied, such as plane wing, cylinder, or cone, etc., but they are always very small. Therefore, for each single bulge, the flow or vortex created is minimal, and the flow disturbance very limited. In order to reach the goal of flow disturbance, many such bulges are needed but still does not effectively transfer the energy at the boundary into mainstream, failing to correct the problem of mainstream short flow. With a traditional cooling and dehumidification method, after the moisture is eliminated, the gas temperature might drop too much to satisfy users' requirements on temperature. And the traditional way also results in energy waste for reheating of the gas, generally equaling to cool the consumed energy. This doubles the waste of energy. This is irrational and in urgent need of solution.

SUMMARY OF THE INVENTION

As the boundary layer of the current system impedes heat transfer, the mainstream short flow cannot be fully heated/cooled and the cold treatment is separated from the hot treatment, which result in the waste of a great amount of energy, the present invention provides a more efficient dehumidifying and drying process with multiple units integrating heating and cooling, and combining the process of cooling for dehumidifying and the process of heating for heat preservation. This invention overcomes the disadvantage that the boundary layer impedes the heat transfer and at the same time breaks the limitation of inefficient heating and cooling of the mainstream and short flow by making use of the semiconductor that has the dual effects of heating and cooling.

In order to achieve the goals of the invention, the following technical scheme is adopted:

An integrated dehumidification method that combines boundary layer control with mainstream disturbance enhanced heat exchange, a division of a flow control channel into a cooling & dehumidification channel through a semiconductor, an air runs through the cooling & dehumidification channel before running through the heating & temperature control channel, both channels are divided into multiple parallel and all-round sealed hollow flow channels by the metal vanes that have good thermal conducting properties, each flow channel is deemed as a heat transfer enhancement unit; within each unit, a periodic vortex is formed along a extending direction of the flow channel by setting a boundary layer flow control device adjacent to a boundary layer, thus realizing cleaning of the cold and hot side walls, as a result it destroys the boundary layer blocking heat transfer, and helps to rapidly transfer a cold and heat energy generated on the cold and hot side walls to a flow mainstream channel; a mainstream disturbance device is set on the flow mainstream channel to form an axial vortex at the back of the device to cooperate with a stream emanating from the boundary layer, thus rapidly transferring the cold and heat energy from the boundary layer to a whole field to form an even temperature field.

Therefore, the efficiency of the transfer of heat in channels can be improved and the efficiency of cooling for dehumidifying and heating for heat preservation can be enhanced. In addition, the operational energy consumption can be deduced. The flow control channel, and the use of semiconductors as heat transfer produce a state of low energy consumption, the flow can be first cooled and dehumidified and then heated and the energy preserved, with heat and humidity of the gas perfectly controlled under this condition of low energy consumption. The temperature processing refers to the gas flow through the channel in accordance with the set order, being first cooled and dehumidified and then heated. This process completely overcomes the disadvantage of energy waste in times of cooling and dehumidification in the traditional drying process.

The heat & cold exchange refers to a parallel processing process that the air flows through the channel in accordance with the set order and goes through the process of first cooled and dehumidified and then heated and preservation. This process completely overcomes the disadvantage of serious energy waste in the process of cooled and dehumidified and heated and preservation existing in traditional drying process. In the concurrent process of cooled and dehumidified and heated and preservation, a integral heat exchange enhancement method where the boundary layer cooperate with the main flow for disturbance, the humidity and temperature of air can both be well controlled to meet the need of users.

The invention provides the process of cooling for dehumidifying and that of heating for heat preservation with the parallel and enclosed vanes to divide the incoming flows into multiple independent and concurrent enhancement processing units. The integral heat exchange enhancement method where the boundary layer is mixed with the mainstream for disturbance is constructed within the flow channel of each independent processing unit. Each unit is an independent but concurrent and circumferentially closed flow channel. The materials of the four walls of the flow channels are equipped with metal vanes that have good thermal conductivity for rapid heat exchange.

The invention provides a method where the boundary layer impinges the mainstream to control the flow, which is an innovation in flow control. There are two main aspects that influence heat exchange: 1) Sufficient heat exchange cannot be achieved in mainstream short flow; 2) the heat exchange resistance caused by the boundary layer. With this method, the symmetric large-scale vortex is generated along the mainstream through the mainstream disturbance device to match with the wake flow that is generated through flow disturbance and self-oscillation on the boundary. The vortex with corresponding scale impinges the flow boundary layer, thus forming an even and strong heat exchange mechanism and enhancing the flow control method to a great extent. The technology of vortex enhanced heat transfer generated by flow control is a traditional and common technology. However, overcoming the mainstream short flow and the obstruction of the boundary layer against heat exchange by quickly forming a consistent heat flow environment through the combination of mainstream control with boundary layer flow control is currently a big problem in the flow control technology. This invention deals with this problem. The invention forms axial vortex 190 (the function of which is bringing the energy out of mainstream or into the mainstream for heat exchange) first through mainstream control to form wake vortex 180 (which forms in span-wise extended direction and develops and disperses along the axis, and which damages the boundary layer through rolling and disturbing, thus improving heat exchange between flow field and mainstream to a great degree) with periodical vibration through cylinder perturbation of the flow at the boundary layer. Direct the vortexes in different directions to generate wake flow field 200 as the heat exchange channel between them to create a uniform heat exchange environment through turbulence diffusion. In addition, with the multi-unit channel structure, each unit completes its own internal air treatment separately and thus efficiently, which enables a greater control effect, a larger heat exchange area and a reduction in the possibility for the mainstream air to take away most of the cold/heat energy (or a reduction in the heating/cooling difficulty of the mainstream air), thereby creating a good flow control environment for efficient control of cold & heat exchange.

Preferably, the multiple boundary layer flow control devices are set in axial direction adjacent to the wall surface of the flow channel at the same intervals; the multiple mainstream disturbance devices are set centrally in the axial direction of the flow channel at the same intervals.

In light of the viscous effect of the flow itself, the structure of flow vortex can be quickly deduced. In order to ensure continuous enhancement, the boundary layer and the main disturbance unit are set out to form a periodical layout. The same mechanism can be applied repeatedly until the lowest energy consumption is achieved and the air that has been processed is all at the same temperature. The number of devices and the distance between each device depends on the diameter of the flow channel, as do the flow control devices in the boundary layer and on the wall surface.

Preferably, the boundary layer flow control device is a bluff body.

When the flow is directed over the structure a periodical vortex forms at the wake edge, under the double impact of fluid viscosity and flow inertia. Only if the structure itself is of bluff form cross section can the responding boundary clearing vortex be generated independently. The corresponding cross section of bluff form can be rectangular or oval or triangular and so on. Only the space, size and time characteristics of vortex produce a clearing effect on boundary layer.

Preferably, the bluff body is a disturbance cylinder.

The cylinder is a common bluff structure that strengthens the contact between air and wall surface by making use of the wake flow, thus achieving the goal of enhanced condensation and the separation and transference of heat.

Preferably, the mainstream disturbance device is a triangular or oval or circular blade in axial arrangement along the flow channel on the mainstream channel.

The goal is to produce a vortex structure in a set direction to solve the mainstream short flow problem. As long as the vortex group can form and interact with the vortex for boundary clearing and form the wake flow enhancement field and improve the heat exchange efficiency to a great degree, the goal can be achieved. The mainstream triangle blade in the invention is one of the forms generating the mainstream disturbance vortex group. Similar disturbance vortex group can also form through various types of blunt body flow.

An integrated dehumidification system combines boundary layer control with mainstream disturbance enhanced heat exchange comprising: an insulating case; a semiconductor thermoelectric device in the insulating case consisting of a cold end and a hot end; a first vane assembly on a refrigerating terminal connected below to the cold end, an upstream side of the first vane assembly is connected with an air inlet; catchment trough arranged below the first vane assembly, a drain provided below the catchment trough; a second vane assembly on a heating terminal above the hot end, the first vane assembly comprising at least two vanes arranged longitudinally, each vane of the first vane assembly is provided multiple boundary layer flow control devices longitudinally arranged adjacent to the wall surfaces of the vane respectively, each vane is a heat conductive hollow pipe structure; the second vane assembly comprising at least two vanes arranged longitudinally, each vane of the second vane assembly is provided multiple mainstream disturbance devices longitudinally arranged at a center of the vane, each vane is a heat conductive hollow pipe structure.

The invention provides a system with integral temperature control structure. The system makes the most of the semiconductor effect and processes cooling first and then heating. The system provides enclosed flow control channels with multi-unit processing in the heating and cooling process. In order to ensure high efficiency, metal vanes are employed on the side walls of flow channels, set in line with the direction of incoming flow in parallel with the cold side face, which is on the upper side of the incoming flow. The flow through the multiple parallel channels constituted by enclosed vanes ensures comprehensive condensation. The process of air flow ensures that all the air is evenly treated by making the air fully contact the enlarged cooling end. The flow control device on the boundary layer enables the incoming flow to form a periodical vortex along the flow channel axially, thus clearing the cold and hot side walls. This damages the boundary layer that impedes heat transfer and quickly transfers the heat generated the side wall to the mainstream. The vortex along the mainstream channel forms behind the mainstream disturbance object to mix with the flow dumped from the boundary layer to transfer the heat brought from the boundary layer to the whole field, thus forming an even temperature field and enhancing the heat and cold transfer efficiency within the flow channel. After cooling and dehumidification, the flow enters the stage of heating and preservation. The heating end is under the incoming flow. In addition to making the most of fluid convection characteristics, the flow is divided into corresponding enhancement heating units by parallel enclosed vanes. The construction of each unit boundary layer flow and the flow disturbance is the same. Through this process, the humidity and the temperature of air in the incoming flow can be controlled effectively.

Preferably, the boundary layer flow control device is a disturbance cylinder in axial arrangement along the flow channel.

Preferably, the mainstream disturbance device is a triangular or oval or circular blade in axial arrangement along the flow channel.

Preferably, the longitudinal cross sections of the vane of the first vane assembly is trapezoid to ensure that the condensed and separated water can naturally flow into the water container along the down surface.

Preferably, the cross sections in axial direction of the vane of the first vane assembly is "W" shape.

The channels among the parallel vanes in the shape of W can change the direction of flow and achieve the inertial separation of air and fluid. Since the air is in contact with the cold vane, it ensures the effect of temperature processing at the same time as the inertial separation and wall surface capture.

Preferably, a screen mesh is set adjacent to the surface of the vane of the first vane assembly.

The screen mesh employs the surface tension effect in two ways, the first is the grid mesh size and the second is the distance between the mesh grid and the vane wall surface. In this way, it avoids the need for a big drain directly impacting the condensing field of cold wall surface and facilitates the flow of fluid to the container under the influence of gravity to prevent secondary reabsorption of the condensate. The distance between meshes and vane wall surface depends on the size of flow channel.

The advantages of the integral heat exchange enhancement system with cold & heat exchange, boundary layer control and mainstream disturbance are: full use of the characteristics of semiconductor transferred heat that overcomes the contradiction of double energy consumption in the traditional drying process. The processing system consists of efficient cooling and dehumidification as well as heat preservation through efficient cooling and dehumidification, from the perspective of flow control and heat transfer enhancement, this provides an innovative method of combining the inertial separation and multi-stage condensation. At the same time as improving the condensation process, it greatly enhances the air and fluid separation efficiency and causes the air condensing in the process of cooling to have lower absolute humidity at the same energy consumption. In the process of heat conservation, the method of boundary layer disturbance is adopted which increases the heat transfer efficiency and ensures that there is no overheating during the processing stage. And at the same time, the temperature of outlet air is highly uniform and conserved heat can be used for drying and storage.

DETAIL DESCRIPTION OF THE INVENTION

Figure 1:
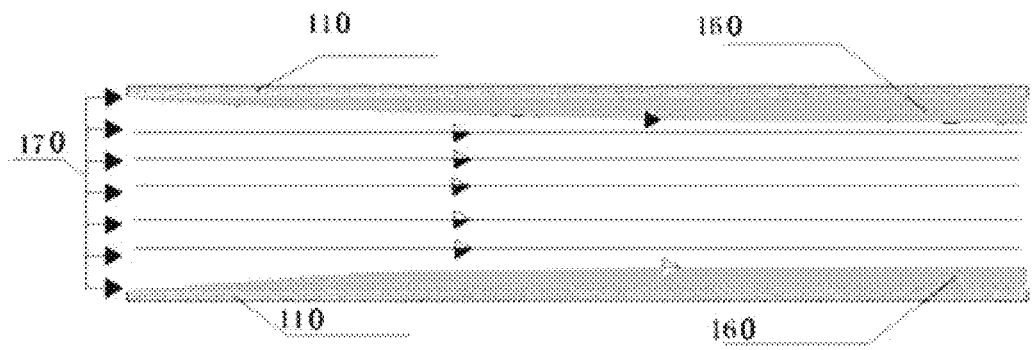
FIG. 1 is a schematic diagram of flow without flow control in the current technology.
Figure 2:
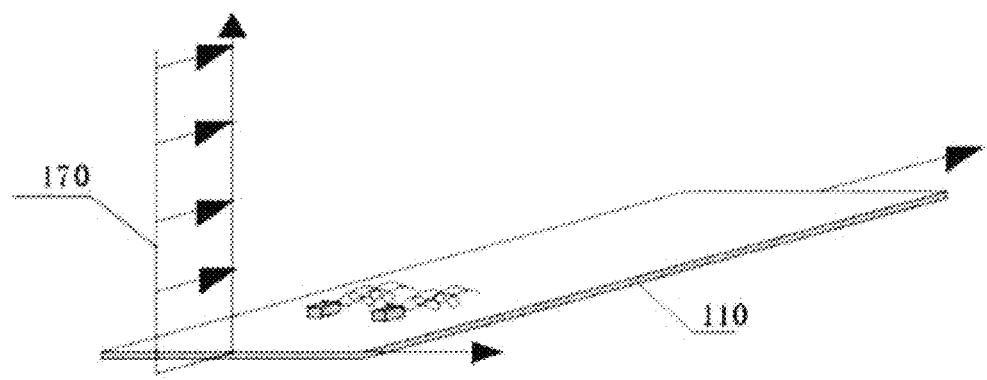
FIG. 2 is a schematic diagram of traditional boundary layer control method and flow in the current technology.
Figure 3:
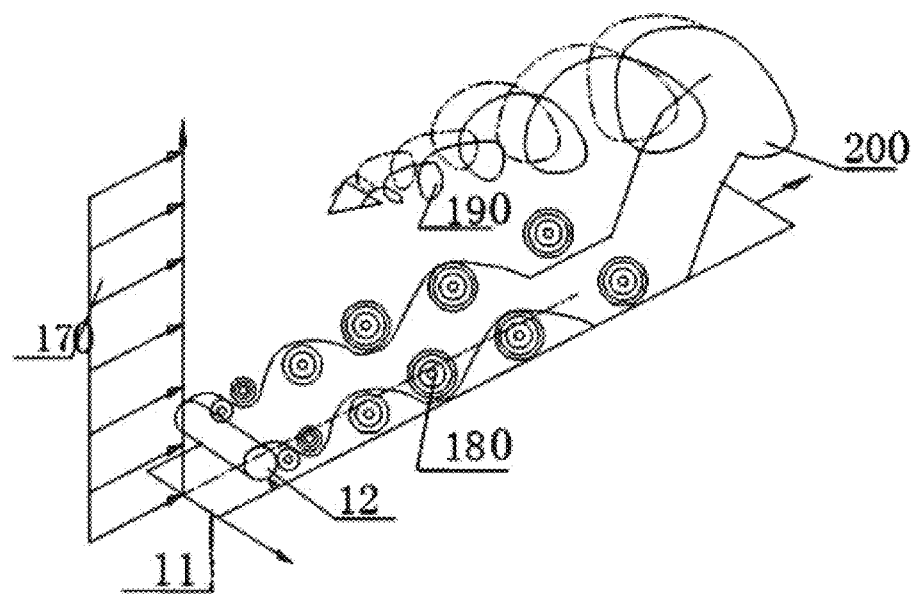
FIG. 3 is a schematic diagram of flow for the invention.
Figure 4:
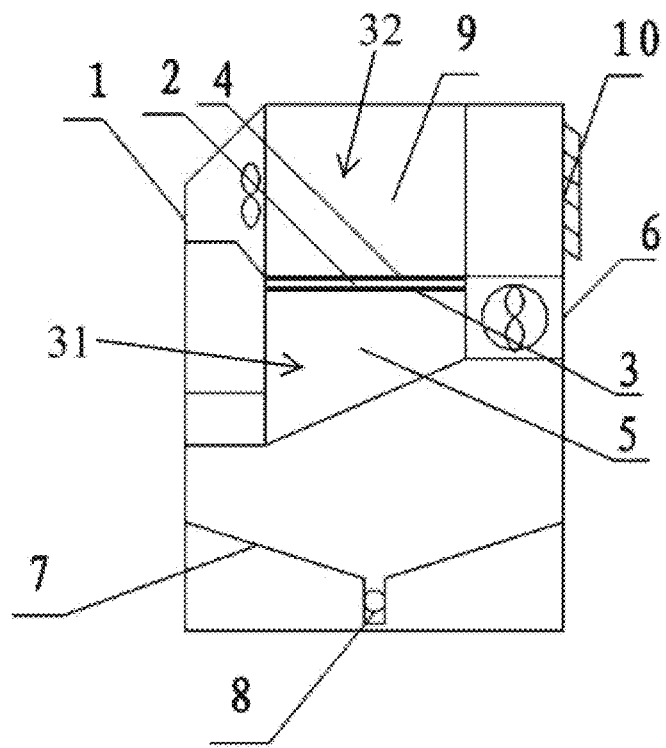
FIG. 4 is a structure diagram of the integral heat transfer enhancement system with boundary layer control and mainstream disturbance for the invention.
Figure 5:
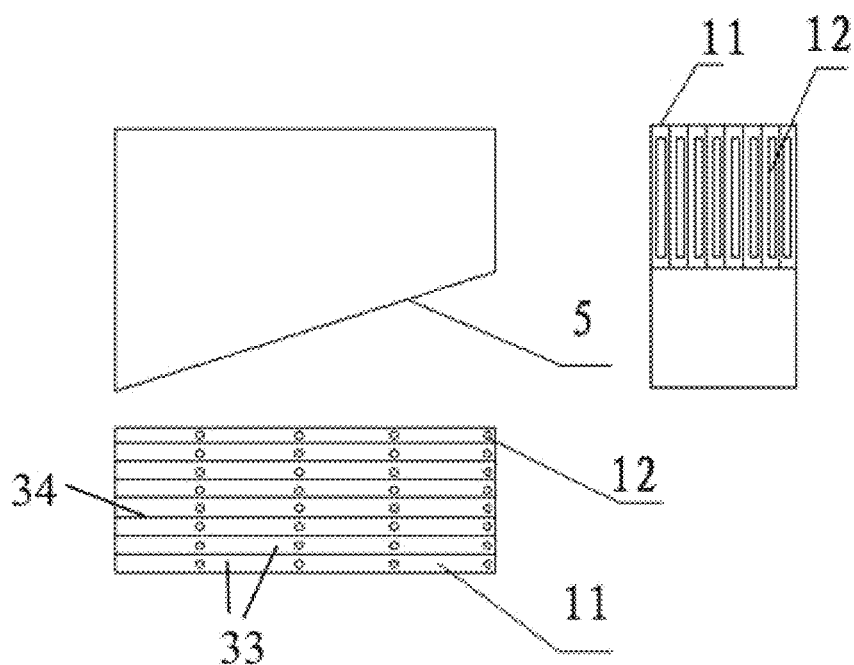
FIG. 5 is a structure diagram of the first vane assembly (the vanes are not equipped with mainstream disturbance device) in Embodiment 1.
Figure 6:
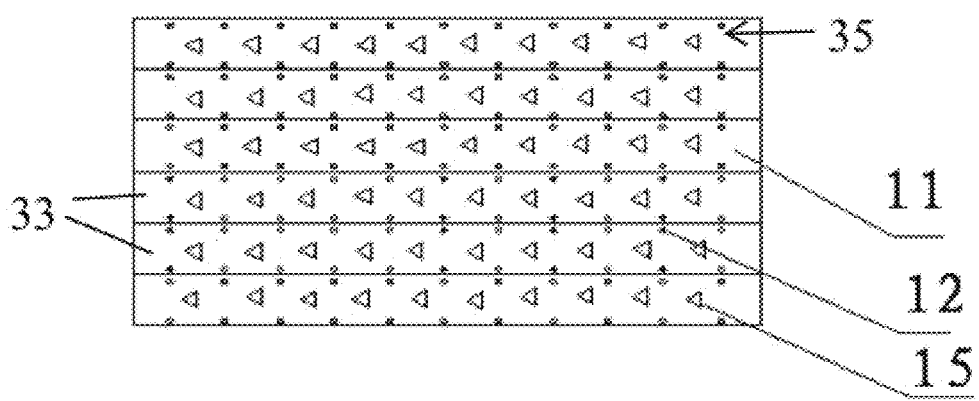
FIG. 6 is a structure diagram of the first vane assembly (the vanes are equipped with mainstream disturbance device) in Embodiment 1.
Figure 7:
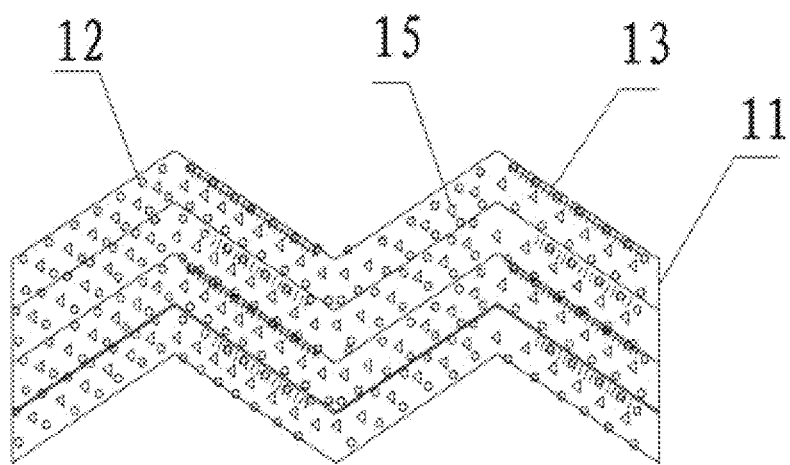
FIG. 7 is a structure diagram of the vanes in the first vane assembly.
Figure 8:
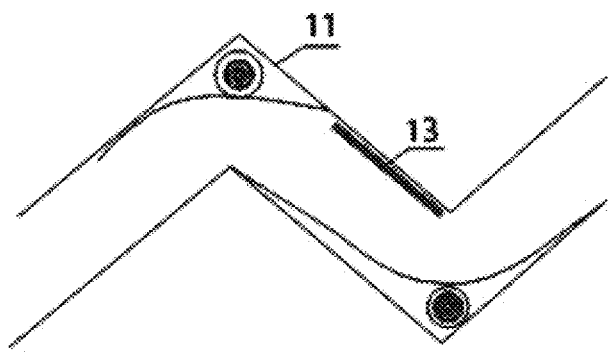
FIG. 8 is a diagram of the relation between the mesh and vane wall surface in the vanes of the first vane assembly in Embodiment 2.
Figure 9:
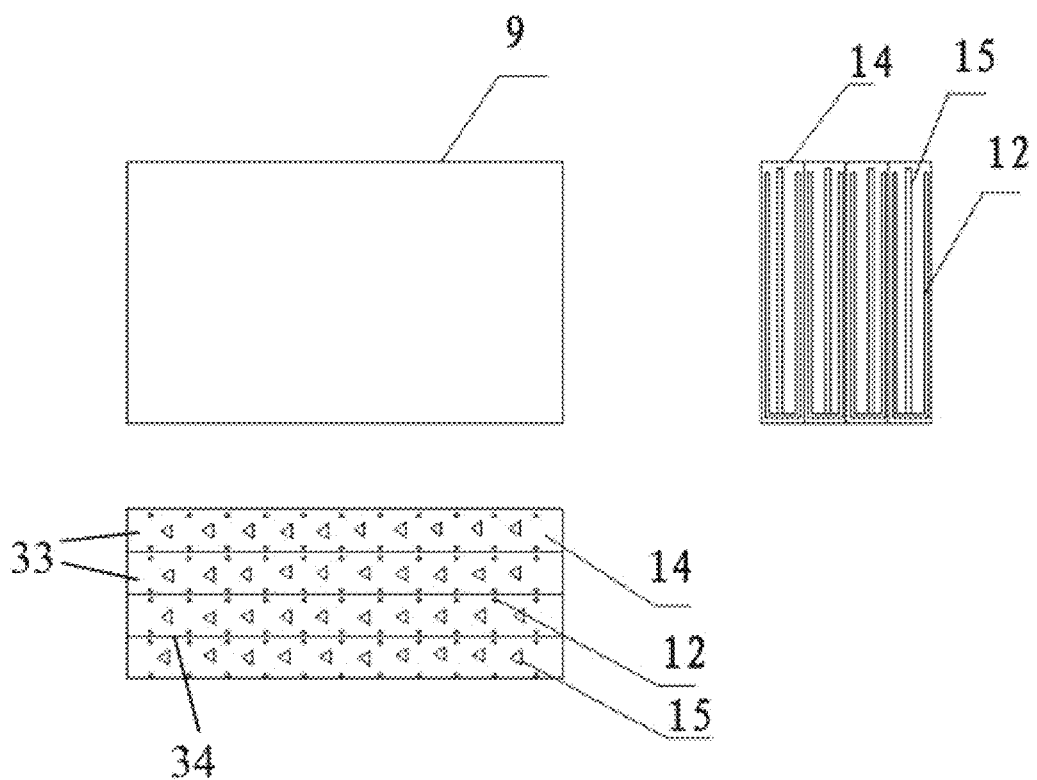
FIG. 9 is a structure diagram of the second vane assembly in Embodiment 2.

The following is a detailed description of the invention by illustrating the attached figures and the implementation modes:

In FIG. 3, An integrated dehumidification method that combines boundary layer control with mainstream disturbance enhanced heat exchange, characterized in that a division of a flow control channel into a cooling & dehumidification channel through a semiconductor, an air runs through the cooling & dehumidification channel before running through the heating & temperature control channel, both channels are divided into multiple parallel and all-round sealed hollow flow channels by the metal vanes that have good thermal conducting properties, each flow channel is deemed as a heat transfer enhancement unit; within each unit, a periodic vortex is formed along a extending direction of the flow channel by setting a boundary layer flow control device adjacent to a boundary layer, thus realizing cleaning of the cold and hot side walls, as a result it destroys the boundary layer blocking heat transfer, and helps to rapidly transfer a cold and heat energy generated on the cold and hot side walls to a flow mainstream channel; a mainstream disturbance device is set on the flow mainstream channel to form an axial vortex at the back of the device to cooperate with a stream emanating from the boundary layer, thus rapidly transferring the cold and heat energy from the boundary layer to a whole field to form an even temperature field. The multiple boundary layer flow control devices are set in axial direction adjacent to the wall surface of the flow channel at the same intervals; the multiple mainstream disturbance devices are set centrally in the axial direction of the flow channel at the same intervals.

In the embodiments of the invention, the boundary layer flow control device is a disturbance cylinder. The mainstream disturbance device is a triangular or oval or circular blade in axial arrangement along the flow channel on the mainstream channel.

The system in the invention adopts the integral processing method of heating and cooling. As for the flow processing procedure, firstly the water is separated when the air flows through the cooling and dehumidification processing end; and then starts the overheating processing where the enhancement unit of the heat end produces the required air temperature. The air to be processed is firstly drawn in through a first fan and secondly goes through the refrigerating terminal 5 of multi-unit boundary layer and the mainstream integral enhancement. Under the action of gravity, the condensate drains to catchment trough 7 along the bottom line of trapezium-cross flow channel. Then the air is efficiently heated when passing through a second fan 4 to a heating terminal 9 of multi-unit boundary layer and mainstream integral enhancement. Therefore, the integral processes of heating and cooling occur. The vane area and the flow rate of units can be designed in accordance with the flow volume of the incoming flow as well as the requirements for temperature.

Embodiment 1

The integrated dehumidification system combines boundary layer control with mainstream disturbance enhanced heat exchange is shown in FIG. 4, FIG. 5, FIG. 6 and FIG. 8.

The system comprises an insulating case 1; a semiconductor thermoelectric device 2 in the insulating case 1, consisting of a cold end 3 and a hot end 4; a first vane assembly on a refrigerating terminal 5 connected below to the cold end 3, an upstream side of the first vane assembly is connected with an air inlet; a catchment trough 7 arranged below the first vane assembly, a drain 8 provided below the catchment trough 7; a second vane assembly on a heating terminal 9 above the hot end 4; the first vane assembly comprising at least two vanes 11 arranged longitudinally, each vane of the first vane assembly is provided multiple boundary layer flow control devices 12 longitudinally arranged adjacent to the wall surfaces of the vane respectively, each vane is a heat conductive hollow pipe structure; the second vane assembly comprising at least two vanes 14 arranged longitudinally, each vane of the second vane assembly is provided multiple mainstream disturbance devices 15 longitudinally arranged at a center of the vane, each vane is a heat conductive hollow pipe structure. The longitudinal cross sections of the vane 11 of the first vane assembly is trapezoid, he cross sections in axial direction of the vane of the first vane assembly is oblong.

Embodiment 2

The integrated dehumidification system combines boundary layer control with mainstream disturbance enhanced heat exchange is shown in FIG. 4, FIG. 7, FIG. 8 and FIG. 9.

The system comprises an insulating case 1; a semiconductor thermoelectric device 2 in the insulating case 1, consisting of a cold end 3 and a hot end 4; a first vane assembly on a refrigerating terminal 5 connected below to the cold end 3, an upstream side of the first vane assembly is connected with an air inlet; a catchment trough 7 arranged below the first vane assembly, a drain provided below the catchment trough 7; a second vane assembly on a heating terminal 9 above the hot end 4; the first vane assembly comprising at least two vanes 11 arranged longitudinally, each vane of the first vane assembly is provided multiple boundary layer flow control devices 12 longitudinally arranged adjacent to the wall surfaces of the vane respectively, each vane is a heat conductive hollow pipe structure; the second vane assembly comprising at least two vanes 14 arranged longitudinally, each vane of the second vane assembly is provided multiple mainstream disturbance devices 15 longitudinally arranged at a center of the vane, each vane is a heat conductive hollow pipe structure. The longitudinal cross sections of the vane 11 of the first vane assembly is trapezoid, the cross sections in axial direction of the vane of the first vane assembly is "W" shape. A screen mesh 13 is set adjacent to the surface of the vane of the first vane assembly.

Embodiment 3

Specific configurations are stated as follows relevant to different industrial applications of this invention:

Domestic dehumidification: Domestic dehumidification mainly involves the storage and quick drying of articles in rainy seasons (hanging articles on the heating terminal). furthermore, it is also highly suitable to provide high-quality air at home. With regard to the wet and cold regions in the Yangtze River basin, this invention can supply separate heating and dehumidification to enhance the user's environment while ensuring low energy consumption. When compared with various conventional heating approaches, it will inevitably improve air treatment efficiency owing to its characteristics of separate heating and dehumidification.

Industrial dehumidification: In view of industrial dehumidification, efficient separation with aerosol has a promising prospect. Conventional dehumidification is normally achieved by means of inertia separation, intercepted separation and filtration with wire mesh, which requires high energy consumption. However, this type of dehumidification is inefficient for aerosol of small grain size in respect of high motion tracking. Efficient separation of aerosol with low energy consumption is a critical problem. Through the full integration of the dual effects of flow control and condensation treatment, this invention can significantly improve the efficiency in the separation of aerosol and vane drips at extremely low energy consumption, beyond the reach of conventional dehumidification methods.

Storage of articles: Articles that are to be stored at constant humidity and temperature. Conventional dehumidification is carried out with methods requiring high energy consumption, such as refrigerated circulating dehumidification, which has the disadvantages of high price and low efficiency. Creation of a suitable air environment for storage in a quick and efficient manner at low energy consumption has considerable application value. The processing device provided by this invention provides suitable temperature and humidity in confined spaces, providing high-quality air to facilitate the long-term storage of articles.

Portable artificial environment: Another important advantage of this invention is that it is available for integration with such new energies and energy conservation techniques as solar energy. Owing to its light weight and small volume, it can provide users with a high-quality air confined space when configured as an enclosed unit through the application of multilayer technology for the space chamber. It is applicable in such special fields as camping, field hospital and archaeological studies.

Comprehensive techniques for economical air circulation system in high-humidity environments: Another application of this invention in a high-humidity environment is in the filtration and disinfection of large quantities of condensate produced by dehumidification in the process of unit dehumidification to provide high-quality potable water at low energy consumption. This method is applicable to various offshore industrial fields or high-humidity regions lacking in water. Whilst providing customers with a comfortable air environment, it can also provide quantities of potable water, thereby forming an economical and comprehensive technical circulation system.

What is claimed is:

1. An integrated heat exchange method by combining boundary layer control with mainstream disturbance comprising:

dividing a flow control channel (31 and 32) into a cooling dehumidification channel (31) and a heating temperature control channel (32) by a semiconductor thermoelectric device (2), running air through the cooling dehumidification channel (31) first and then through the heating temperature control channel (32), dividing the cooling dehumidification channel (31) and the heating temperature control channel (32) into parallel and closed-circumference hollow flow passages (33) by metal vanes (34), the metal vanes (34) have thermal conducting properties, each flow passage (33) is regarded as a heat transfer unit (33);

within each heat transfer unit 33, a multiple of boundary layer flow control devices (12) are set near a flow boundary layer (35) to form a periodic vortex along the flow control channel (31 and 32), for sweeping the cold and hot side walls of the heat transfer unit, as a result the periodic vortex destroys the flow boundary layer (35) that hinders the heat transfer unit (33) and helps to rapidly transferring cold and heat energy generated from the cold and hot side walls to a mainstream of flow;

a multiple of mainstream disturbance devices (15) are set on the mainstream of the flow control channel (32 and 33) to form an axial vortex at the back of each mainstream disturbance device (15), the axial vortex in conjunction with a flow from the flow boundary layer 35 rapidly transfer the cold and heat energy from the flow boundary layer (35) to the entire field of the flow control channel (32 and 33).

2. The integrated heat exchange method by boundary layer control with mainstream disturbance of claim 1, wherein a multiple of boundary layer flow control devices (12) are set in axial direction adjacent to the wall surface of the flow control channel (31 and 32) at a same interval; a multiple of mainstream disturbance devices (15) are set in the middle of the flow control channel (31 and 32) at a same interval along axial direction.

3. The integrated heat exchange method by boundary layer control with mainstream disturbance of claim 2, wherein the boundary layer flow control device (12) is a bluff body.

4. The integrated heat exchange method by boundary layer control with mainstream disturbance of claim 3, wherein the bluff body is a disturbance cylinder.

5. The integrated heat exchange method by boundary layer control with mainstream disturbance of claim 2, wherein the mainstream disturbance device (15) is column with a triangular or oval or circular cross section.

6. A heat exchange system combines with integrated heat exchange method by boundary layer control and mainstream disturbance comprising:

an insulating case (1);

a semiconductor thermoelectric device (2) including a cold end (3) and a hot end (4) in the insulating case;

a first vane assembly located in a refrigerating terminal (5), which is connected to the bottom face of the cold end (3), an upstream side of the first vane assembly is connected with an air inlet;

a catchment trough (7) arranged below the first vane assembly, a drain (8) is provided below the catchment trough (7);

a second vane assembly located in a heating terminal (9) above the hot end (4);

the first vane assembly comprises at least two vanes (11) arranged in parallel, each vane (11) of the first vane assembly is provided a multiple of boundary layer flow control devices (12) longitudinally arranged adjacent to the wall surfaces of the vane respectively, each vane (11) is a thermally conductive hollow pipe structure;

the second vane assembly comprises at least two vanes (14) arranged in parallel, each vane (14) of the second vane assembly is provided a multiple of mainstream disturbance devices (15) longitudinally arranged at a middle position of the vane, each vane is a thermally conductive hollow pipe structure.

7. The heat exchange system combines with integrated heat exchange method by boundary layer control and mainstream disturbance of claim 6, wherein the boundary layer flow control device (12) is a disturbance cylinder.

8. The heat exchange system combines with integrated heat exchange method by boundary layer control and mainstream disturbance of claim 6, wherein the mainstream disturbance device (15) is a column with a triangular or oval or circular cross section.

9. The heat exchange system combines with integrated heat exchange method by boundary layer control and mainstream disturbance of claim 6, wherein the longitudinal cross sections of the vane of the first vane assembly is trapezoid.

10. The heat exchange system combines with integrated heat exchange method by boundary layer control and mainstream disturbance of claim 9, the cross sections in axial direction of the vane of the first vane assembly is W shape.

11. The heat exchange system combines with integrated heat exchange method by boundary layer control and mainstream disturbance of claim 9, wherein a screen mesh (13) is set adjacent to the wall surface of the vane of the first vane assembly.

* * * * *